Aug. 12, 1969     P. J. HERB     3,461,221

ELECTRICAL CONNECTOR FOR FLAT CONDUCTOR CABLE

Filed Nov. 3, 1967

INVENTOR.
PHILLIP J. HERB
BY
Kenyon & Kenyon
ATTORNEYS

United States Patent Office 3,461,221
Patented Aug. 12, 1969

3,461,221
ELECTRICAL CONNECTOR FOR FLAT CONDUCTOR CABLE
Philip J. Herb, North Branch Station, N.J., assignor to Thomas & Betts Corporation, a corporation of New Jersey
Filed Nov. 3, 1967, Ser. No. 680,536
Int. Cl. H02g 15/08; H01r 5/10
U.S. Cl. 174—84         10 Claims

ABSTRACT OF THE DISCLOSURE

The connector has a slot sized to receive a folded over conductor end of a flat conductor cable along with an insulated portion of the cable. Also, the connector has a bore sized to pass over a post of a bus bar. The connector is deformable so as to be initially crimped about the slot to the flat conductor cable and subsequently crimped about the bore to the post to form an electromechanical connection.

---

This invention relates to an electrical connector for flat conductor cable. More particularly, this invention relates to an electrical connector for connecting flat condutor cable to conductor posts.

Heretofore, electrical circuitry has utilized individually insulated electrical conductors in the shape of round wires to form electrical connections from one component to another. However, where many electrical connections have been made either the conductors have occupied a relatively large space or the conductors have been crowded together. In the latter case the termination of the conductors has been difficult to accomplish. In addition, where such round wire conductors have been terminated for connection to an electrical component, blade type terminals have frequently been used together with the attendant disadvantages of such blade type terminals. In order to overcome these and other disadvantages of round wire circuitry, flat conductor cables have been developed. These flat cables have generally consisted of rolled flat conductors, usually of copper, which are spaced apart and sandwiched between plies of insulation material such as Mylar sheets. The plies of insulation are bonded to each other so that the flat conductors are held securely in place to effect a one-piece flat conductor cable structure.

While flat conductor cables provide many advantages over other types of conductors, the termination of the individual conductors of a flat cable to an electrical component or assembly has presented a problem in certain applications. For example, where the conductors are to be connected to conductor tabs, the flat conductor cable has been stripped to expose the ends of the conductors and the exposed conductor ends have been soldered directly to the tabs. This, however, allows a strain to be developed in the conductors behind the soldered connection such that failure of the connection has sometimes occurred at these places.

Accordingly, it is an object of the invention to terminate a flat conductor cable in a reliable manner.

It is another object of the invention to impart a strain relief to the end of a flat conductor cable connected to an electrical component.

It is another object of the invention to provide a connector for connecting a flat conductor cable to an electrical component.

Briefly, the invention provides an electrical conductor for forming an electro-mechanical connection between a flat conductor and the posts of a bus bar of an electrical component. The connector is formed in a substantially cube shape with a bore passing completely through the connector from one face to an opposite face and a slot the width of the connector in one of the same faces as the bore. The bore is sized in a complementary manner to the post of the bus bar while being of slightly larger dimensions to slip over the post. The slot is sized similarly to receive a stripped end of a flat conductor in folded over relation. The connector is formed of an electrically conductive material, such as powdered sintered metal, which is capable of being crimped inwardly without failure to engage a folded over flat conductor cable end in the slot and a post of the bus bar in the bore in order to form an electro-mechanical connection therewith.

In use, after the terminal end of a flat conductor is stripped to expose the conductors, each of the conductors is folded over the unstripped portion of the cable and inserted into the slot of a connector. Thereafter, each of the connectors is crimped to the respective conductors of the cable. The cable is then transported to the bus bar of the electrical component and each connector is slipped over the posts on the bus bar via the bores. The connectors are each then crimped onto the posts to form an electro-mechanical connection therewith. In this manner, a flat conductor cable is connected to a suitable bus bar in a simple reliable manner.

These and other objects and advantages of the invention will become more apparent from the following detailed description and appended claims taken in conjunction with the accompanying drawings in which:

Figure 1:
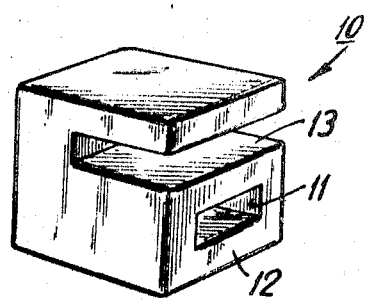
FIG. 1 illustrates a perspective view of an electrical connection of the invention.

Referring to FIG. 1, the connector 10 is formed as a generally cube-shaped body of a deformable material, such as, a powdered sintered material which is compressively deformable without failure under compressive crimping forces. The material of the connector 10 is also of an electrically conductive material, such as copper, and, where preferable, can be tinned to increase conductivity. The body of the connector 10 has a bore 11 of rectangular cross section which extends from one face 12 of the connector 10 to the opposite face 12′ (not shown). In addition, the connector 10 has a slot 13 in the face 12 which extends inwardly towards the opposite face 12′ and which extends across the width of the face 12. The slot 13 is sized to extend into the connector 10 a distance equal to about one-half the thickness of the connector from face 12 to face 12′.

Figure 4:
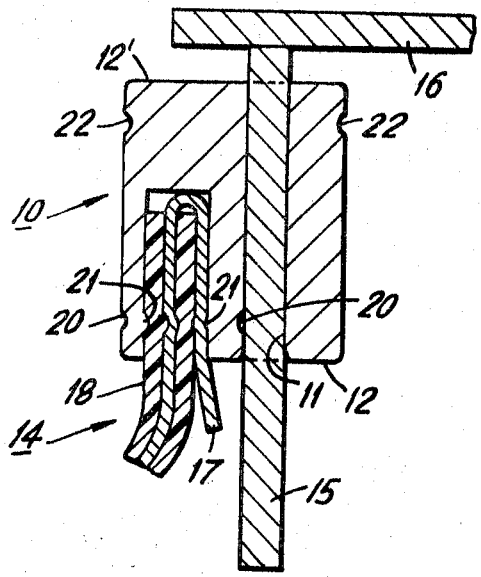
FIG. 4 illustrates a view taken on line 4—4 of FIG. 3.

Referring to FIG. 4, the connector 10 is used to form an electro-mechanical connection between a flat conductor cable 14 and a post 15 of a bus bar 16. The bore 11 of the connector 10 is initially sized to be of slightly larger dimensions than the dimensions of the post 15 of the bus bar 16 so as to be easily slipped over the post 15. However, after being crimped as described below, the bore 11 is reduced in size in at least one direction to the dimension of the post 15. The slot 13 of the connector 10 is similarly sized to be of slightly larger dimension than the flat conductor cable 14 so that, as described below, a stripped end of a conductor 17 can be folded over the insulated portion 18 of the flat cable 14 and inserted with the insulated portion 18 into the slot 13 without interference. Since the end of the conductor 17 is folded over the insulated portion 18 within the connector slot 13, the insualted portion 18 provides a strain relief for the stripped end of the conductor 17.

Figure 2:
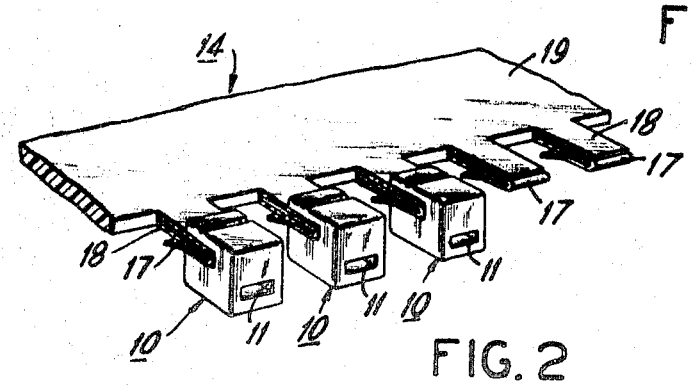
FIG. 2 illustrates a connection between a flat conductor cable and a plurality of electrical connectors of the invention.

Referring to FIG. 2, in order to form an electrical connector between the flat conductor cable 14 and the posts 15 of the bus bar 16, the terminal end of the flat conductor cable 14 is first stripped of insulation 19 on each side of the conductors 17 to expose the ends of each conductor 17. Next, each exposed conductor 17 is folded over the insulated portion 18 of the cable 14. A connector 10 is then slid over each conductor end with the slot 13 of each connector receiving a conductor and insulated portion. Thereafter, the connectors 10 are each crimped by a suitable tool onto the folded over conductors and insulated portions to form an electro-mechanical connection therebetween. During this crimping operation, two opposite portions of each connector 10 defining the slot 13 are deformed under a compressive force without failure to reduce the size of the slot 13. This allows the deformed portions of the connector 10 to engage one side of the connector 17 and one side of the insulated portion 18 along substantially continuous contact surfaces thereby providing a reliable electrical connection. The crimping of the connectors 10 results in the forming of a pair of opposed indentations 20 in the connector 10 to effect the formation of corresponding protuberances 21 which penetrate slightly into the conductor 17 and insulated portion 18 to ensure the mechanical connection.

Figure 3:
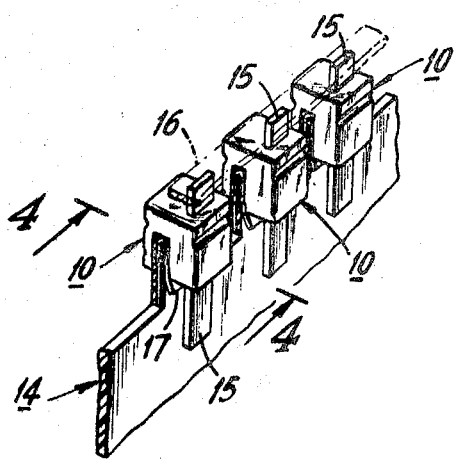
FIG. 3 illustrates a connection between a flat conductor cable and the posts of a bus bar effected by the electrical connectors of the invention.

Referring to FIG. 3, after a connector 10 is secured to each of the conductors 17 of the flat conductor cable 14, the cable 14 is transported to the bus bar 16. The bore 12 of each connector 10 is then aligned with a post 15 of the bus bar 16 and the connector slid over the post. Next, each connector 10 is crimped by a suitable tool under a compressive force so as to deform without failure about the contained posts 15. For example, the crimping force is applied at the end of each connector opposite the mouth of the slot 13 so as to deform the connector in an area remote from the slot 13. The crimping operation results in a reduction in the size of each bore 11 so that at least two opposite walls of each bore 11 contact a post 15 uniformly to form an electro-mechanical connection. The crimping operation can also result in the formation of a pair of indentations 22 in the outside surfaces of the connector 10 at the points of application of the crimping forces.

The invention thus provides a connector which permits a flat conductor cable to be electro-mechanically connected to the posts of a bus bar in a rapid simple efficient manner. The connector permits the connection to be made with a minimum of insulation being stripped from the conductor cable while also allowing the insulation contained within the slot of the connector to provide a strain relief for the exposed end of a conductor.

It is noted that the bore of the connector can be formed with any cross section which is complementary to the shape of a post, for example, square, circular, etc.

Having thus described the invention, it is not intended that it be so limited as changes may be readily made therein without departing from the scope of the invention. Accordingly, it is intended that the abstract of the disclosure and the subject matter described above and shown in the drawings be interpreted as illustrative and not in a limiting sense.

What is claimed is:

1. An electrical connector for flat conductor cable comprising a body having a pair of opposite faces, a bore passing through said body from one of said faces to the other of said faces, and a slot in said one face extending inwardly towards said other face and extending across the width of said one face, said slot being sized to receive one end of the flat cable, said body being deformable under compressive forces without failure about opposite sides of said slot and said bore to reduce the size of said slot and said bore.

2. A connector as set forth in claim 1 wherein said body is cube-shaped.

3. A connector as set forth in claim 1 wherein said body is made of powdered sintered metal.

4. A connector as set forth in claim 3 wherein said metal is copper.

5. A connector as set forth in claim 1 wherein said bore is rectangular in cross section.

6. An electrical connection comprising
an electrically conductive connector having a bore passing therethrough from one face to an opposite face thereof and a slot extending from said one face towards said opposite face across the width of said one face;
a flat conductor cable having an insulated portion and a conductor end disposed in folded over relation on said insulated portion, said conductor end and insulated portion being electro-mechanically received in said slot; and
a post electro-mechanically received in said bore of said connector for electrical connection to said flat conductor cable.

7. An electrical connection as set forth in claim 6 wherein said post is rectangular in cross section and said bore is complementarily shaped.

8. An electrical connection as set forth in claim 6 wherein said connector is cube-shaped.

9. An electrical connection as set forth in claim 6 wherein said connector is made of a material deformable under a compressive force to reduce said slot onto said flat conductor cable and said bore about said post without failure.

10. An electrical connection as set forth in claim 9 wherein said material is a powdered sintered metal.

References Cited

UNITED STATES PATENTS 3,376,170   4/1968   Logan et al. _____ 136—233

FOREIGN PATENTS 235,047   8/1961   Australia.

RICHARD E. MOORE, Primary Examiner

JOSEPH H. McGLYNN, Assistant Examiner

U.S. Cl. X.R.

339—17, 276